United States Patent [19]

Linder

[11] 3,849,256
[45] Nov. 19, 1974

[54] SUBSTRATE-CONTAINING TEST CONTAINER
[76] Inventor: Fritz Linder, 440 60 Skarhamn, Sweden
[22] Filed: Oct. 13, 1972
[21] Appl. No.: 297,230

[30] Foreign Application Priority Data
Jan. 31, 1972   Sweden.............................. 1081/72

[52] U.S. Cl. ......................... 195/139, 195/103.5 R
[51] Int. Cl. ............................................ C12k 1/10
[58] Field of Search ............. 195/103.5 R, 127, 139

[56] References Cited
UNITED STATES PATENTS
3,651,926   3/1972   Elfost ............................. 195/127 X
3,701,717   10/1972   Ingvorsen .......................... 195/139

Primary Examiner—A. Louis Monacell
Assistant Examiner—Robert J. Warden
Attorney, Agent, or Firm—Murray Schaffer

[57] ABSTRACT

A device for use in and a method of testing for example, a liquid or gas, preferably urine, in respect of the concentration of impurities therein, its resistance to certain substances or for measuring the concentration in a sample under investigation. Said device comprising a casing having a removable lid and a hollow testing column disposed within the casing, the testing column having a number of test fields which are spaced apart from each other and which are located along respective parts of the surface of the column, which parts face the casing.

14 Claims, 5 Drawing Figures

PATENTED NOV 19 1974          3,849,256

SHEET 1 OF 2

SUBSTRATE-CONTAINING TEST CONTAINER

BACKGROUND OF INVENTION

This invention relates to a device for use in and a method of testing for example, a liquid or gas, and is particularly but not exclusively concerned with a device for use in analysing a fluid (measuring the concentration of impurities, therein, for example), investigating the resistance of the fluid to certain substances, or for measuring the concentration of the fluid in a sample under investigation.

For the sake of simplicity the invention will be described as applied to a urine testing device, without of course being limited to this particular application.

As is known, chronic urethral infections often result in kidney infections which require dialysis or kidney transplants. It is therefore important that such kidney infections, which often show no easily recognisable symptoms, can be diagnosed as early as possible. At present, various means are used to quickly and simply diagnose urethral infections, most of these being in the form of impregnated test strips which, when brought into contact with the urine, show a certain colour indication if a urethral infection is present. Such a method of diagnosis is of course simple since it can even be performed by the patient himself, but it gives the doctor no important information as to the nature of the discase. In order to provide a survey of the nature of the discase, therefore, urine must be subjected to a careful laboratory examination and for this purpose it is necessary to use a transport package which keeps the object for examination effectively insulated until it reaches the laboratory so that the object cannot come into contact with extraneous substances and objects possibly carrying bacteria, and also so that it is easily accessible for subsequent treatment in the laboratory, even when it must be inspected microscopically.

It is an object of the present invention to provide a method and a simple and unexpensive device for eliminating the above mentioned drawbacks. The object and others, as well as a numerous advantages of the present invention will be seen from the following disclosure.

SUMMARY OF INVENTION

According to the present invention there is provided a device for use in testing, which device comprises a casing having a removable lid, and a hollow testing column disposed within the casing, the testing column having a number of test fields which are spaced apart from each other and which are located along respective parts of the surface of the column, which parts face the casing.

The casing is preferably transparent and has a tightly fitting lid, and the testing column preferably extends from the lower edge of the lid and projects into the casing.

For a better understanding of the present invention and to show how the same may be carried into effect, reference will now be made, by way of example, to the accompanying drawings, in which:-

DESCRIPTION OF INVENTION

Figure 1:
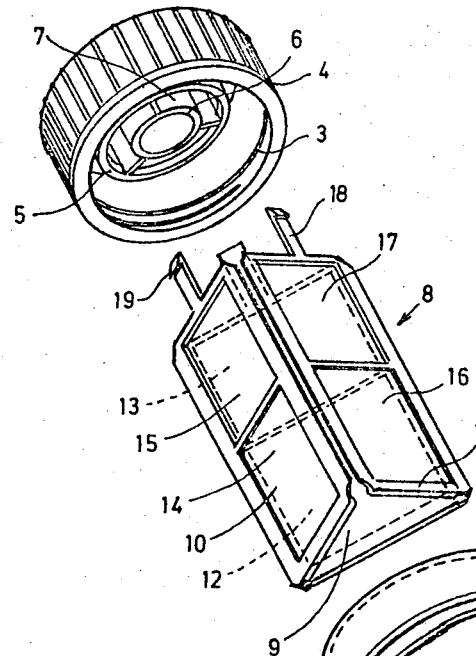
FIG. 1 shows an exploded perspective view of a device according to the present invention.
Figure 2:
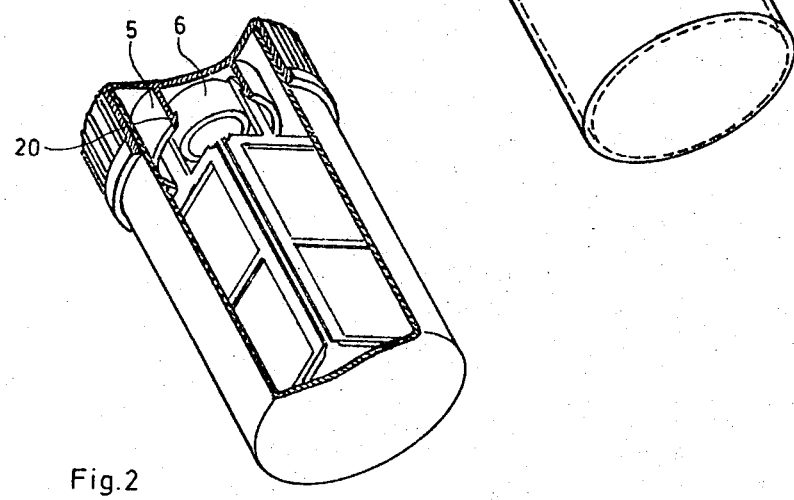
FIG. 2 shows a perspective view of the device of FIG. 1 when fitted together.
Figure 3:
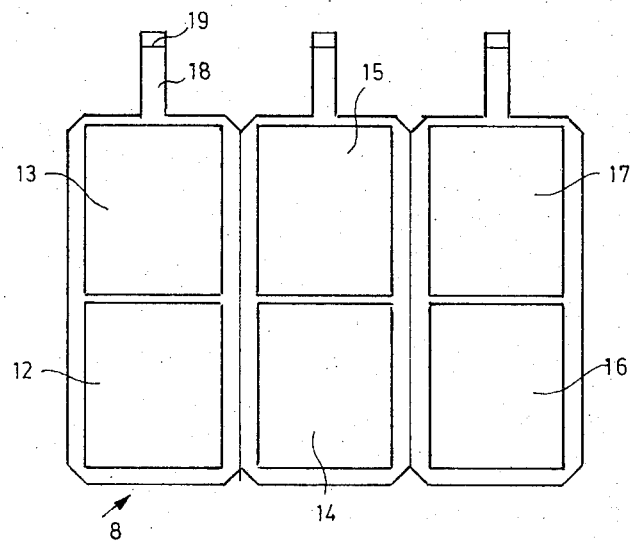
FIG. 3 shows a test column, forming part of the device of FIGS. 1 and 2, unfolded.

Referring now to FIGS. 1 to 3 of the drawings, a cylindrical casing 1, expediently comprising a transparent plastics material, is provided with an external thread 2 which is complementary to an internal thread 3 in a lid 4. The lid is provided on the lower side with two peripheral flanges 5, 6 spaced from each other which form between them an annular gap 7 intended to hold detachably a testing member 8. When assembled (see FIGS. 1 and 2) the device comprises a hollow test column of substantially triangular cross section. Each of the three outwardly facing surfaces 9, 10, 11 has two test fields 12, 13; 14, 15 and 16, 17, respectively, separated from each other. As can be seen from FIG. 3, the test column 8 can expediently be manufactured in one piece from plastics material, by means of injection moulding, and afterwards given the desired shape by folding in the side surfaces 10, 11 towards each other as seen in FIGS. 1 and 2. From the upper part of the test column 8, that is from the upper edges of the side surfaces 9, 10, 11, respective suspension means 18 project, these having hooklike prongs 19 at the front end arranged to hook firmly on to a collar 20 arranged on the lower part of the peripheral flange 5 when the test column is inserted in the gap 7 of the lid 4.

As can be seen from FIG. 3, the test column 8 has a total of six test fields, that is the fields 12, 13, 14, 15 and 16, 17. Obviously, the number of test fields can be varied arbitrarily and the test fields suitably comprise depressions in the surface of the column so that they can be filled with, for example, culture medium, or a suitable chemical.

Figure 4:
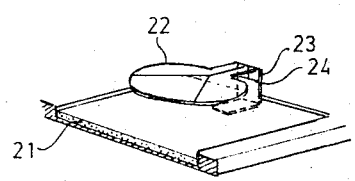
FIG. 4 shows, on a larger scale, a perspective view of part of a test column of another device according to the present invention.

FIG. 4 shows, on a larger scale, a test field of another test column which has a resistance pad. The test field is "box-shaped" and inset in the surface of the column. The test field is intended to be filled with for example a culture medium 21. A resistance pad 22 is arranged slightly above the test field and may comprise, for example, a suitably impregnated filter paper which is kept at a predetermined distance above the layer of culture medium 21 by means of a spacer 23. The spacer 23 is in this case suitably attached by glue, or the like, to the bottom of the test filed and has a liquid barrier 24 just above the layer of culture medium. The spacer may suitably comprise a strip of stiff paper or the like and the resistance pad 22 may be circular.

Figure 5:
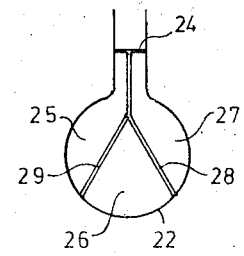
FIG. 5 shows a diagrammatic sketch, on a larger scale, of a resistance pad forming part of the test column of FIG. 4.

FIG. 5 shows, on an enlarged scale, a circular pad 22 which is provided with a number of test zones 25, 26, 27 separated from each other by liquid barriers 28, 29. The device shown in FIGS. 1 to 3 of the drawings works in the following manner:

In order to perform a urine test, for example, the test field 14 was filled with Mac Conkey blood-agar and the test 15 with normal agar. This means that in the test field 14 only gram-negative, pathogenic bacteria and enterococci could grow. In the test field 15, however, all bacteria could in principle grow. The test field 16 was filled, for example with Mac Conkey blood-agar with the addition of a low concentration of a sulphonamido and the test field 12 with the same blood-agar but with a higher concentration of sulphonamide. The test field 17 was filled with the same blood-agar but with the addition of nitrofurantoin and the test field 13 with the same blood-agar but with an addition of, for example, ampicillin.

The agar surfaces in these test fields were then contaminated with urine. It was possible by reading fields 14 and 15 to immediately diagnose whether a urethral infection existed or not. At the same time, by comparing the growth in the test fields 12 and 16 with the growth in the test field 14 it could be ascertained whether the bacteria were sensitive to sulphonamido and possibly even make a concentration estimate. Furthermore, a comparison of the growth in the test field 17 with the growth in the test field 14 revealed the sensitivity to nitrofurantoin and a comparison between the test field 13 and the test field 14 provided direct information as to the sensitivity to ampicillin.

Resistance tests are normally performed in the laboratory and the urine must generally be transported there under refrigeration. In the laboratory an agar-plate is then contaminated with the urine and one or more resistance pads impregnated with various substances are then applied on the agar-surface. After the incubation an edge zone free from bacteria can be observed around the resistance pad if the impregnation in question is active against the test.

A device according to the invention can be used with advantage for performing such resistance tests without the refrigerated urine having to be transported to the laboratory. As can be seen from the embodiment shown in FIG. 4, such a resistance pad 22, suitably impregnated, for example in the form of an ordinary filter paper, was fixed in position above the agar layer 21 with the help of a spacer 23. The liquid barrier 24 for example comprised a layer of varnish which prevented moisture from the agar layer 21 from penetrating up into the spacer 23 and the dry resistance pad 22 during transport and the dry spacer 23 was stiff enough to maintain the dry resistance pad 22 in position over the agar layer 21. However, when the test column 8 provided with such resistance pads 22 was immersed in the urine, the urine was sucked up into the pad 22 and the spacer 23, resulting in an increase in weight and the pad 22 consequently came into contact with the agar layer 21, due to the loss in stiffness of the pad and the spacer. Excess urine was then shaken from the test column 8 and this was placed in the casing which was then sealed with the lid 4. The urine test could then be sent to the laboratory without refrigeration and the result read after the usual incubation period.

As can be seen from FIG. 5, each resistance pad 22 may be provided with different test zones 25, 26, 27 which have been impregnated with different substances and/or different concentrations of the same substance. Expediently, these test zones are separated from each other by means of liquid barriers 28, 29, in the form of layers of varnish or the like.

Another advantage of a device in accordance with the present invention is that is may function very satisfactorily even with small quantities of test liquid. In such cases, the casing can be placed horizontally and the column 8 can be turned around.

Furthermore, the attachment of the column 8 in the lid 4 can easily be constructed so that if the lid is turned in one direction the column 8 does not turn, whereas if the lid is turned in the opposite direction the column 8 will automatically turn.

As an alternative to the above the test column 8 itself need not be triangular in shape but may be given a completely or partly cylindrical surface or it may be only two-dimensional, i.e., have only two column surfaces. Furthermore the cross-section of the test column 8 can be varied arbitrarily and may therefore be in the shape of a polygon, for example. The invention can also be used, of course, in other fields, for example as indication means for air pollution, and in the detection of poisonous gases, the test fields of the test column being suitably impregnated or coated.

Various modificants have been dissolved, other will be obvious to those skilled in the art. Consequently, it is intended that the present disclosure by taken as illustrative and not as limiting of the present invention.

What is claimed:

1. A fluid testing device comprising a casing, having a removable screw lid, and a hollow testing colum disposed within the caseing, said testing column having a number of test fields spaced apart from each other said test fields being located along respective parts of the surface of the column, facing the casing, an annular groove formed in the lower face of said lid and suspension means projecting from the upper part of said testing column into said annular groove for detachably holding said testing column.

2. A device according to claim 1, wherein the testing column has a substantially triangular cross section.

3. A device according to claim 2, wherein the testing column was manufactured in one piece by injection moulding and folded into its cross section.

4. A device according to claim 1, wherein the test fields are each coated with a testing medium.

5. A device according to claim 4, wherein at least one of the test fields contains a culture medium.

6. A device according to claim 1, wherein the test fields contain different testing media.

7. A device according to claim 1 wherein different test fields contain the same testing medium in different concentrations.

8. A device according to claim 1, including a stationary resistance pad spaced from the face of said testing column that when the testing column is immersed in the fluid to be tested, the testing pad is caused to contact the test field.

9. A device according to claim 8, wherein the resistance pad is held in position by means of a spacer, one end of which is fixed at the bottom edge of the respective test field and the other end of which carries the resistance pad cantilevered therefrom.

10. A device according to claim 9, including a fluid barrier arranged on a part of the spacer which is located above the testing medium.

11. A device according to claim 9 wherein the resistance pad and spacer are formed of an absorbant material.

12. A device according to claim 9 wherein the resistance pad is divided into several test zones which are to be separated from each other by means of fluid barriers.

13. A device according to claim 1 wherein said annular groove and said projecting means are provided with cooperatively engaging retaining means.

14. A device according to claim 13, wherein said projecting means are hook prongs and said annular groove is formed with a receiving collar.

* * * * *